United States Patent
Dück et al.

[11] Patent Number: 4,957,212
[45] Date of Patent: Sep. 18, 1990

[54] NON-CIRCULAR PISTON RINGS

[75] Inventors: Gerhard Dück, Burscheid; Hans-Rainer Brillert, Odenthal; Albin Mierbach, Leverkusen, all of Fed. Rep. of Germany

[73] Assignee: Goetze AG, Burscheid, Fed. Rep. of Germany

[21] Appl. No.: 263,964

[22] Filed: Oct. 26, 1988

Related U.S. Application Data

[63] Continuation of Ser. No. 858,494, Apr. 30, 1986, abandoned.

[30] Foreign Application Priority Data

May 2, 1985 [DE] Fed. Rep. of Germany ....... 3515659

[51] Int. Cl.$^5$ ............................. F16J 9/00; F16J 9/12
[52] U.S. Cl. .................................... 277/217; 92/177; 123/193 P; 277/1
[58] Field of Search ................. 277/216, 217; 92/177, 92/233; 29/156.6; 123/193 P

[56] References Cited

U.S. PATENT DOCUMENTS

| 1,406,475 | 2/1922 | Morgal | 277/217 |
| 4,198,065 | 4/1980 | Fukui | 277/217 |
| 4,306,730 | 12/1981 | Honda et al. | 277/217 |

FOREIGN PATENT DOCUMENTS

| 3032722 | 4/1982 | Fed. Rep. of Germany | 92/177 |
| 714364 | 8/1954 | United Kingdom | 277/217 |

OTHER PUBLICATIONS

*Standard Handbook for Mechanical Engineers*, 7th ed, edited by T. Baumeister, McGraw Hill, pp. 5-42 and 2-70.
"Reference Data for Radio Engineers", 4th ed., ITT, p. 1064.

*Primary Examiner*—Allan N. Shoap
*Attorney, Agent, or Firm*—Spencer & Frank

[57] ABSTRACT

A piston ring whose contour deviates from the circular shape, and in particular an elliptical or oval piston ring, which, when seen in the circumferential direction, has regions that, in the installed state as well as in the operating mode, exert less radial contact pressure than the remaining surface regions in order to reduce wear of and leakage by the ring.

4 Claims, 1 Drawing Sheet

NON-CIRCULAR PISTON RINGS

This application is a continuation of application Ser. No. 06/858,494, filed Apr. 30, 1986, now abandoned.

BACKGROUND OF THE INVENTION

The present invention relates to a piston ring for non-circular, particularly oval or elliptical cylinders, with the ring being interrupted at one point of its circumference. As seen in the circumferential direction, radii of curvature of the ring deviate from one another before and after installation of the ring in an associated cylinder.

U.S. Pat. No. 4,306,730, issued Dec. 22nd, 1981, to Honda et al, discloses an elliptical piston ring having a gap provided in a short region of the ring. The ring is widened in its long region before installation in an engine cylinder, so that, in the installed, cold state, when compressed again to its gap tolerance, the radial pressure exerted onto the surrounding cylinder wall is uniform over the entire circumference of the ring. This is accomplished by a change in the radii of curvature of the ring by mechanical deformation of the ring before and during assembly thereof.

It is known that piston rings must be fit tightly into a cylinder so that no light passes through a gap between the running surface of the piston ring and the cylinder wall. Therefore, in their non-installed state, the contour of piston rings must be determined to within at least 0.01 mm. In the piston rings discussed in the above-mentioned U.S. patent, the contour of the rings is found empirically. With the degree of precision required, however, an empirical contour determination for a piston ring in the non-installed state with simultaneous conclusions as to the radial contact pressure involved in the installed state appears to be highly dubious.

Moreover, the piston ring in question also has the following drawbacks:

During engine operation, oval piston rings, and elliptical rings in particular, expand more in the longitudinal direction thereof than does the surrounding cylinder wall. At low temperatures, which accompany the installed but not-operating mode, a certain point of the piston ring will contact the cylinder wall at another point than it will contact the same wall in the warm state encountered during the operating mode. Piston ring and cylinder wall thus change their relative positions as a function of temperature. For a piston ring as disclosed in U.S. Pat. No. 4,306,730, this results in an increase of the radial contact pressure in certain circumferential regions which ultimately produces increased wear with the result of a short service life. Depending on the contour of the piston ring, the thermally effected change in position may also produce such a deformation in the transition region of the radii of curvature that the ring will be untight to light; i.e., it will permit the fluid medium to be sealed off to pass through a gap between the piston ring running surface and the cylinder wall.

With round cylinders and their associated piston rings, thermal expansion of the rings does not produce problems because the radius of curvature of the rings is constant over the circumference thereof. Thus, the change in length need be considered only in the amount of play between the gap ends. Calculations for thermal expansion of round piston rings are known in the art. See, for example, German Published Application 1,021,666, or German Pat. No. 842,742. But, the statements made in these publications cannot be transferred to any piston rings which deviate from the circular shape, and particularly not to piston rings of elliptical or other oval contours.

SUMMARY OF THE INVENTION

It is an object of the present invention to provide an improved non-circular piston ring by selecting the contour of the ring in such a manner that, in particular, the force imparted to the ring during manufacture thereof will not result in critical points developing on the circumference of the piston ring after installation or during operation, so as to result in increased ring wear or unacceptable leakage by the ring.

This and other objects are accomplished according to the present invention by providing a non-circular piston ring wherein the radii of curvature of the ring circumference before installation differ from those of the ring circumference after installation so that defined circumferential regions of the piston ring exert a different radial contact pressure on the cylinder walls in the installed and operational state than the remaining surface regions of the ring. In this manner, it is assured that in spite of increased changes in length of the piston ring relative to the cylinder wall, no critical points are created which produce higher contact pressures or untightnesses to light in engine operation and, thus, permit increased wear in these regions.

The regions of the ring which exert a lower radial contact pressure on the cylinder wall than the remaining surface regions are preferably arranged at transitions between different radii of curvature of the ring. For purely elliptical piston rings, a gradual transition occurs between the long side and the short side from one major radius of curvature to the other, while for oval piston rings which have essentially flattened longitudinal sides, in the manner of a race track, one radius of curvature changes immediately to the other radius of curvature. This is where the critical points on the circumference of the piston ring will essentially be found which are subject to increased radial contact pressure due to thermal changes in length of the piston ring with respect to the cylinder wall. Therefore, these regions must preferably be structurally designed so that they lie against the cylinder wall with a radial contact pressure which is less than that of the remaining surface regions.

As mentioned above, the transition regions of the radii of curvature deviate from one another as a function of the shape of the piston ring so that, according to a further feature of the invention, depending on whether the piston ring is elliptical or has some other oval shape, the regions of reduced radial contact pressure intercept a sector of the ring at an angle in a range between 5° and 45°. The regions in question are preferably disposed at both sides of the gap ends, offset with respect to the gap by a defined angle of rotation, and also in regions diametrically opposite the gap ends. Thus, regardless of whether the gap is disposed in the center of the long side or of the short side of the ring, the regions having the smallest radius of curvature exert the greatest radial contact pressure on the cylinder wall. Even if the radii of curvature change along the piston ring circumference due to thermal changes in length, it is assured that the radial contact pressure in the critical regions is less than in the remaining surface regions of the piston ring.

In contradistinction to U.S. Pat. No. 4,306,730 discussed above, the contour of the proposed piston ring is not determined empirically. In view of the physical characteristics of such a piston ring system, it is therefore proposed to determine the contour of piston rings according to the present invention both in the non-installed state as well as in the installed and operating state by mathematical calculation.

The invention is illustrated in the drawing and will be described in greater detail below.

DESCRIPTION OF THE PREFERRED EMBODIMENTS

Figure 1:
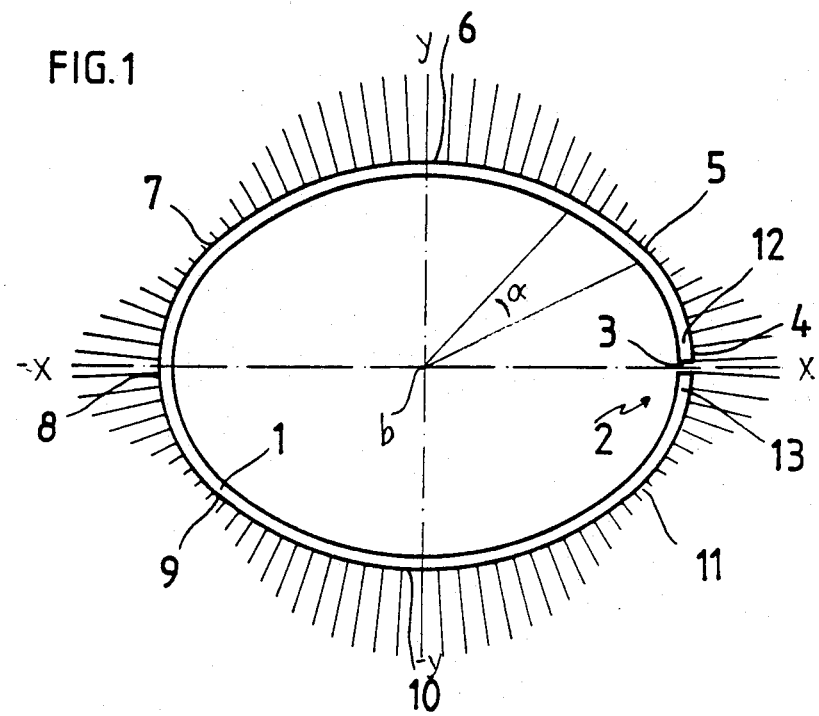
FIG. 1 is a diagrammatic plan view of an elliptical piston ring according to the present invention shown in the installed state and indicating the distribution of radial forces around the ring.

FIG. 1 shows diagrammatically an elliptical piston ring 1 according to the present invention in the installed mode thereof. The force distribution shown in this figure can be considered analogous to that of an oval piston ring having, for example, essentially linear longitudinal sides (see FIG. 3).

As mentioned above, piston rings must not permit light to pass through a portion of the running face of the piston ring and the cylinder. Therefore, the contour of the ring 1 in the free, or non-installed, state thereof must be determined to within at least 0.01 mm. This is not done empirically, but mathematically with the aid of a formula set forth below; i.e., by numerical integration. A contour produced according to this mathematical formula is shown in FIG. 1. Piston ring 1 has gap 3 disposed in the center region of a short side 2. Due to its elliptical contour, piston ring 1, when seen in the circumferential direction, has a plurality of radii of curvature designated 4, 6, 8, and 10. Transition regions 5, 7, 9, and 11 lie between radii of curvature 4, 6, 8, and 10, and are shaped such that, in the installed mode, they exert a reduced radial, or outward, contact pressure on an associated cylinder wall (not shown). This reduced contact pressure must be maintained at all times, even in an operating mode, although not in the same manner as in a cold, or non-operating, state, so as to prevent increased wear in regions 5, 7, 9, and 11. The latter extend over an angle α of rotation of, for example, about 30° about a center point b in the illustrated embodiment; however, this dimension changes with different contours of a piston ring 1, and must be newly determined from embodiment to embodiment.

Starting at the gap ends 12, 13 of piston ring 1, regions 4, 6, 8 and 10, spaced 90° to one another when taken counterclockwise, are the regions which have the smallest radii of curvature and exert the greatest radial contact pressure on the cylinder wall.

The changes in curvature of the piston ring between the non-installed state and the installed state should meet the following differential equation:

$$\Delta k = \frac{v''}{(1 + v'^2)^{3/2}} - \frac{y''}{(1 + y'^2)^{2/3}} = \frac{M}{(E) \cdot (I)}$$

where $\Delta k_\Delta$ is the change in curvature between the installed state and the non-installed state;

u, $v_\Delta$ are the cartesian coordinates of the non-installed state (after solving the differential equation);

x, $y_\Delta$ are the cartesian coordinates of the installed state (after solving the differential equation);

$M_\Delta$ is the moment generated by the contact pressure;

$E_\Delta$ is the modulus of elasticity;

$I_\Delta$ is the moment of surface inertia;

$v' = dv/du$ is the first derivative of v with respect to u;

$v'' = d^2v/du^2$ is the second derivative of v with respect to u;

$y' = dy/dx$ is the first derivative of y with respect to x; and $y'' = d^2y/dx^2$ is the second derivative of y with respect to x.

In the above cited differential equation the coordinates x and y define the contour of the cylinder wall (not shown in the drawing). The cylinder wall contour will be given by the motor manufacturer. In the case of FIG. 1 the contour of piston ring i is elliptical. The coordinates of the non installed piston ring is defined with u and v. The differences between the according coordinates x respectively y and u, respectively v are proportional to the moment M generating the contact pressure. It is to be stated that the distribution of the contact pressure over the ring circumference has an effect on the corresponding moment value M since M is the moment of the pressure distribution. Additionally M is the specific value of the differential equation discussed above. Therefore the distribution of the contact pressure has an effect over M on u and v.

Figures 2, 3:
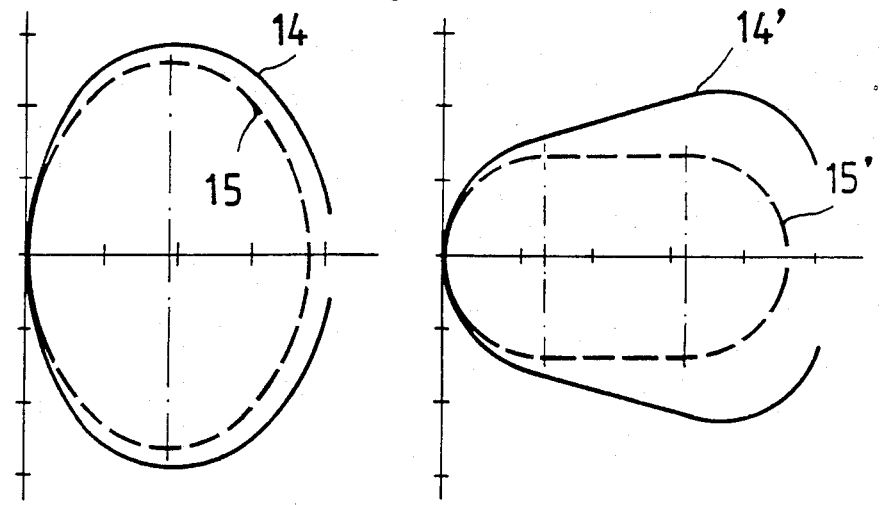
FIGS. 2 and 3 show diagrammatically contours of an elliptical and an oval piston ring, respectively, both in the non-installed state and in the installed state, with the gap of the ring being disposed at different locations in each embodiment.

FIGS. 2 and 3 are diagrammatic views of piston rings having contours calculated according to the above equation in the non-installed state 14, 14' and in the installed state 15, 15', respectively. For reasons of clarity, only the center lines of these embodiments of pressure-optimized piston rings according to the invention are shown. As already indicated, it is insignificant for the present invention which contour, other than circular, the piston ring is given or at which side of the ring a gap is disposed, provided the gap is symmetrically located and the force distribution around the ring follows a pattern similar to that seen in FIG. 1. Transition regions will intercept a sector of a ring 1 at an angle from where a radii of curvature is taken in a range between 5° and 45° depending on the contour of the ring.

This application contains subject matter related to that disclosed in the commonly owned patent application No. 35-15-659.7, filed May 2nd, 1985, in the Federal Republic of Germany, and the disclosure of this German application hereby is incorporated herein by reference.

It will be understood that the above description of the present invention is susceptible to various modifications, changes and adaptations, and the same are intended to be comprehended within the meaning and range of equivalents of the appended claims.

What is claimed is:

1. A piston ring for a non-circular engine cylinder, which cylinder has a wall contacted by the ring, the cylinder being in an engine which is in a cold state before being placed into operation, said ring having a plurality of first circumferential regions spaced apart around the circumference of said ring and each having a defined radius of curvature which differs from one first region to the next around the circumference of said ring, and a plurality of second circumferential regions each interposed between two succeeding first regions and each formed to effect a transition between the radii of curvature of the two succeeding first regions, wherein said second regions are configured for exerting on the cylinder wall a radial contact pressure which is less than that exerted by said first regions when said ring is installed in the cylinder and the engine is in its cold state.

2. A piston ring as defined in claim 1, wherein the change in curvature of the circumference of said ring between a non-installed and an installed mode is determined by a differential equation as follows:

$$\Delta k = \frac{v''}{(1 + v'^2)^{3/2}} - \frac{y''}{(1 + y'^2)^{2/3}} = \frac{M}{(E) \cdot (I)}$$

where $\Delta k_\Delta$ is the change in curvature between the installed state and the non-installed state;

u, $v_\Delta$ are the cartesian coordinates of the non-installed state after solving the differential equation;

x, $y_\Delta$ are the cartesian coordinates of the installed state after solving the differential equation;

$M_\Delta$ is the moment generated by the contact pressure;

$E_\Delta$ is the modulus of elasticity;

$I_\Delta$ is the moment of surface inertial;

$v' =_\Delta dv/du$ is the first derivative of v with respect to u;

$v'' =_\Delta d^2v/du^2$ is the second derivative of v with respect to u;

$y' =_\Delta dy/dx$ is the first derivative of y with respect to x; and $y'' =_\Delta d^2y/dx^2$ is the second derivative of y with respect to x.

3. A piston ring as defined in claim 1 wherein each said second region has a circumferential extent of 5° to 45°, as a function of the contour of said ring.

4. A piston ring as defined in claim 1 wherein said second regions are configured for exerting on the cylinder wall a radial contact pressure which is less than that exerted by said first regions when the engine is in operation.

* * * * *